Patented Jan. 23, 1951

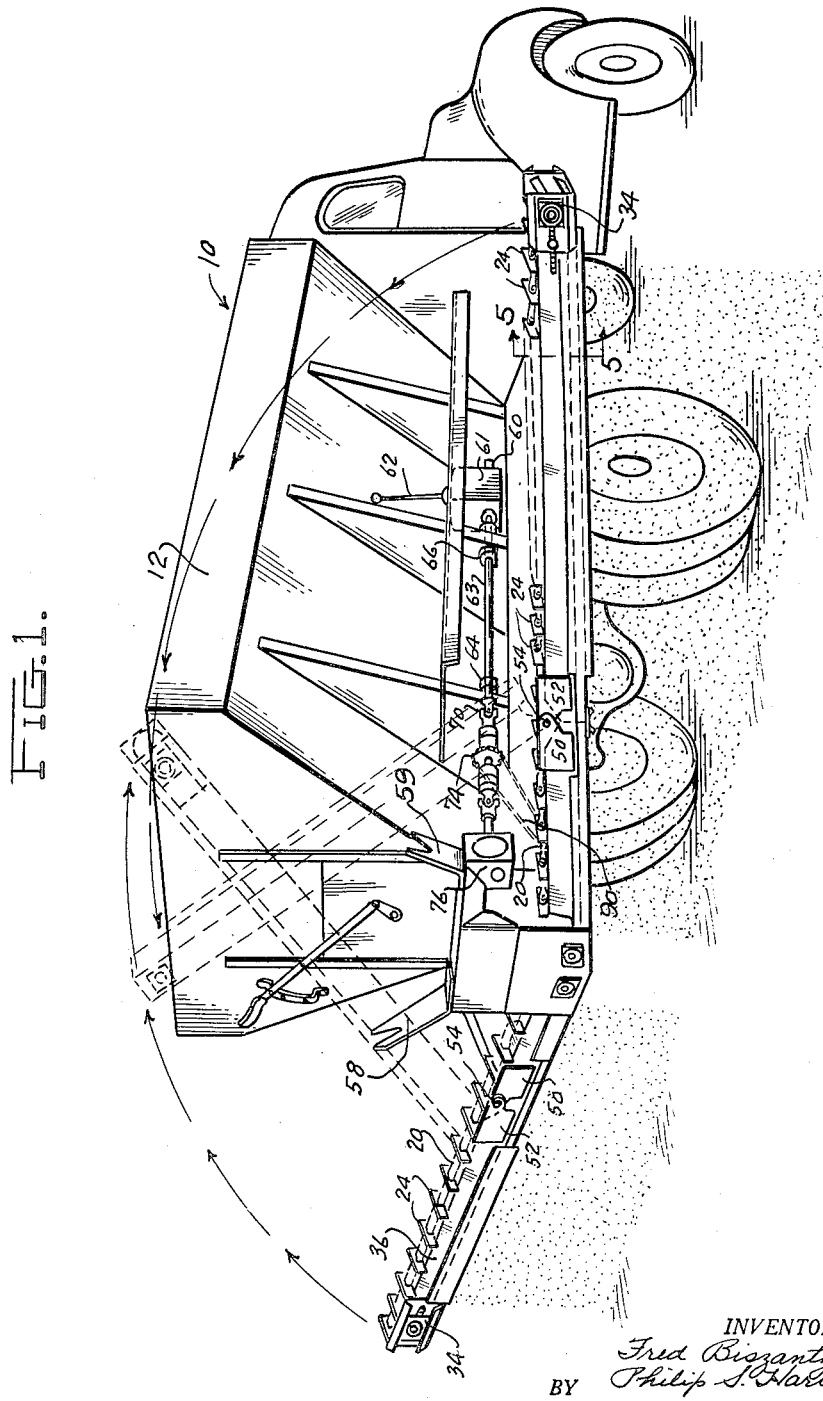

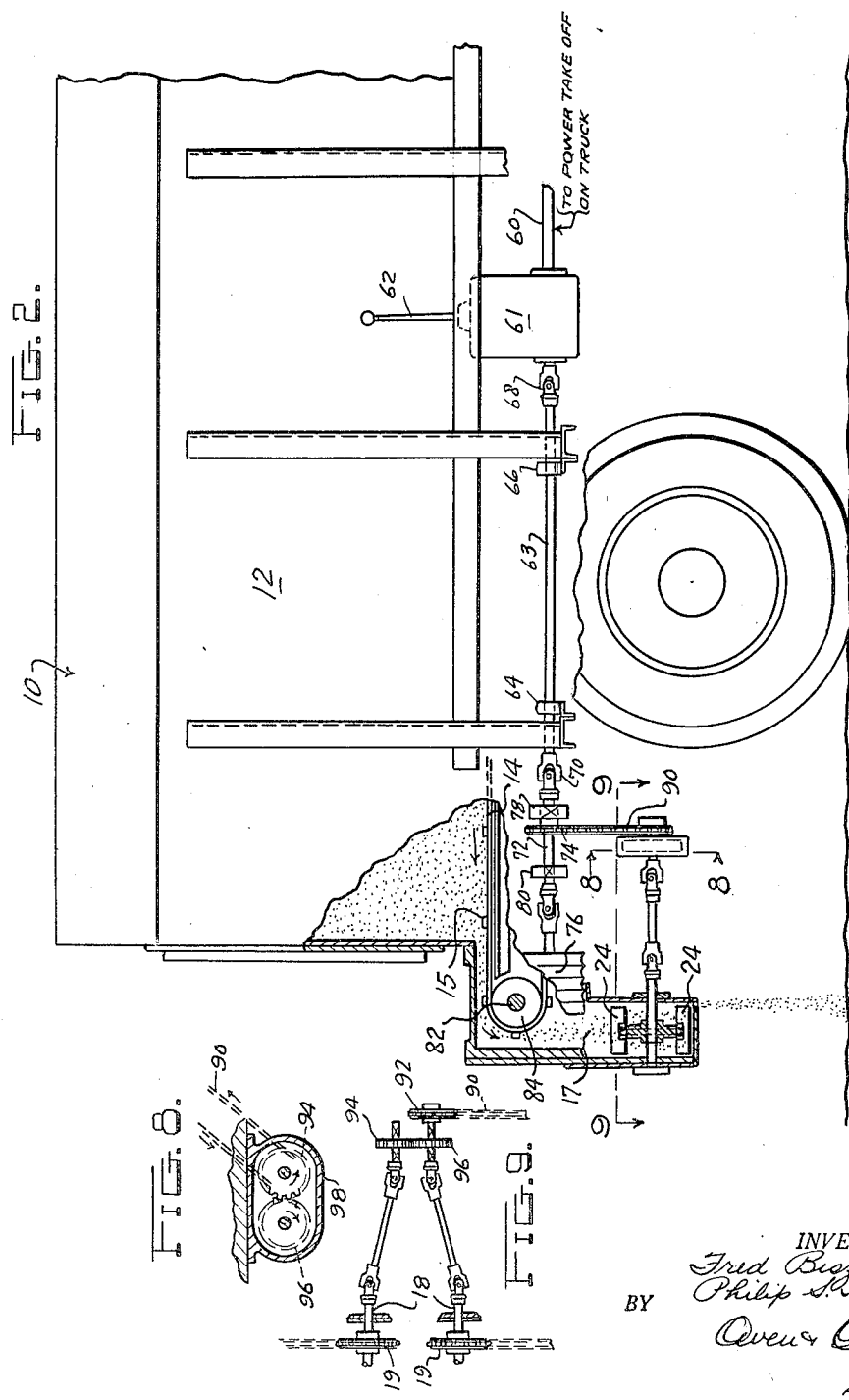

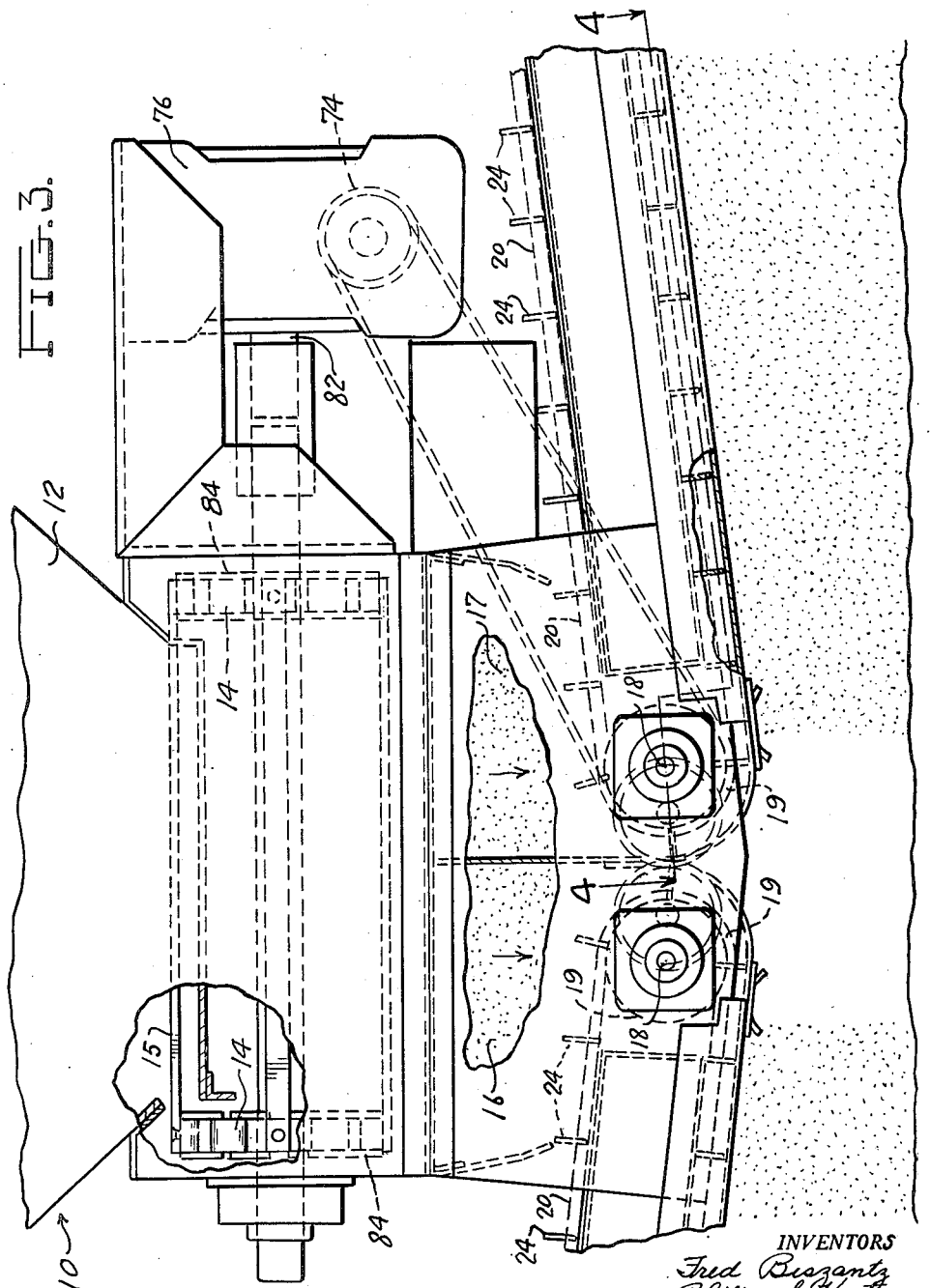

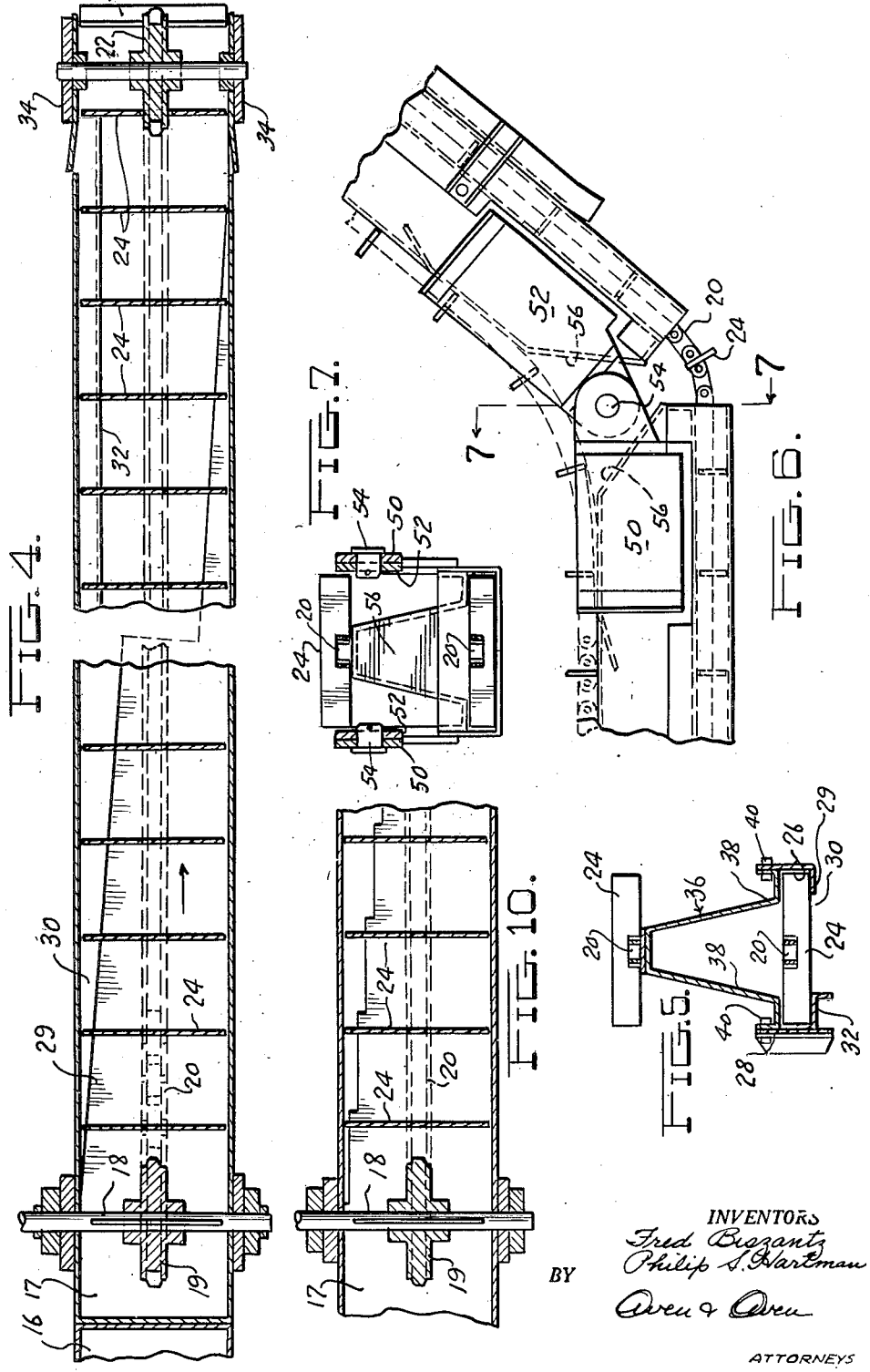

2,538,961

UNITED STATES PATENT OFFICE 2,538,961

MATERIAL SPREADING APPARATUS

Fred Biszantz and Philip S. Hartman, Galion, Ohio, assignors to Hercules Steel Products Corporation, Galion, Ohio, a corporation of Ohio Application November 5, 1948, Serial No. 58,548

5 Claims. (Cl. 275—2)

1

This invention relates to an apparatus to spread granular materials such as fertilizers and has for its primary object to provide an apparatus capable of depositing a predetermined covering of material over a wide range of speeds and with widely vary material characteristics.

In present spreading devices for granular fertilizer and similar materials it is the usual practice to convey the material from a hopper or supply to a laterally disposed spreading tube having a screw-type conveyor operating therein. The tube is usually provided with holes or slots through which material is discharged. It has been found that at slow speed operation, the largest proportion of the material falls through the openings nearest the hopper and relatively little is carried to the remote end, so that the field is unevenly fertilized. Conversely, at high speeds, insufficient discharge takes place adjacent the inner end of the spreader tube and the bulk of the material is carried outwardly and packs in the end of the spreader tube, if closed, or, spills out at this point if the end of the spreader tube is open. It has also been proposed to utilize revolving discs having radial vanes attached thereto as spreading means, the vanes catching the material as it is dropped from the hopper and throwing it outwardly. Such apparatus operates to cause heavy clouds of dust and very uneven spreading of the material. It is thus apparent that these devices must be operated in a critical, narrow range of speed if satisfactory results are to be obtained.

The present invention provides an apparatus in which spreading of the material is accomplished evenly, whether the discharge is continuous as in overall covering operations, or intermittent as in fertilization of rows. Means are provided for speed variation of the distributing elements to accommodate a wide range of materials of different analysis regardless of fineness and moisture content.

An important object of the present invention is to provide a spreader which covers a wide area in use but in which certain parts may be folded out of all protruding positions to permit the carrying vehicle to run on highways without dismantling or disconnecting any of the folded parts.

Another object of the invention is to provide a simple and efficient spreading apparatus which is substantially self-cleaning and which is not likely to get out of order as a result of continued and hard usage.

Other objects and advantages of the invention

2 will become apparent from the following description of a preferred embodiment, reference being had to the accompanying drawings in which:

Fig. 1 is a rear perspective view of a truck having a spreader constructed in accordance with the present invention mounted thereon; Fig. 2 is a fragmentary side elevational view of a truck and spreader unit, with parts broken away; Fig. 3 is a fragmentary rear elevation with parts in section and parts broken away; Fig. 4 is a section on line 4—4 of Fig. 3; Fig. 5 is a section on line 5—5 of Fig. 1; Fig. 6 is a side elevation of a suitable joint between sections of a distributing conveyor; Fig. 7 is a section on line 7—7 of Fig. 6; Fig. 8 is a section on line 8—8 of Fig. 2; Fig. 9 is a section on line 9—9 of Fig. 2; and Fig. 10 is a diagrammatic plan view of an alternate form of distributing plate.

Referring to the drawings and particularly to Fig. 1, the present invention is shown in connection with a truck 10 having a hopper-type body 12.

Broadly the invention comprises means to move material rearwardly out of the body into right and left smaller receiving hoppers from which it is distributed laterally by means of improved conveying units. The invention resides particularly in the structure of the distributing conveyors. The structure, in accordance with the invention, operates to spread evenly any normal quantities of granular materials when run at a reasonable speed, if the material can be delivered to the conveyors in proper amounts. It is not unusual to have requirements varying from 100 pounds per acre to 4000 pounds per acre. Known spreading mechanisms are incapable of handling material over this wide range.

Any convenient form of supply conveyor may be utilized to move material out of the body and the hopper may be of an open or closed construction, but is preferably filled from the top, with material flowing by gravity to the bottom. A suitable conveyor for moving material out of the truck may consist of side chains 14 and cross bars 15 working longitudinally of the hopper bottom and discharging into small receiving hoppers 16 and 17 at the rear of the truck body.

Journalled in the front and rear walls of each of the hoppers 16 and 17 are shafts 18 on which sprockets 19 are carried to drive the lateral distributing conveyors. Since the conveyors are similar in construction, description of one will suffice for both.

Each conveyor comprises a central chain 20 or similar drive unit trained over sprocket 19 and over outer end sprockets 22. At suitable intervals the chain carries laterally extending paddles 24. The lower side of the conveyor, after passing drive sprocket 19, enters a channel 26, as indicated in Fig. 5, in which the several blades or paddles 24 fit closely enough so that material caught ahead of each paddle is advanced as the paddle progresses toward the outer sprocket 22. The channel 26 has solid front and rear walls, and either or both walls may be additionally braced by a plate 28 if desired. The channel bottom 29 at its inner end immediately adjacent sprocket 19 is a continuous member from front to rear relative to the direction of vehicle travel. However, as shown in Fig. 4, the bottom constitutes an orifice plate for the conveyor and is formed to provide either a progressively widening opening or a slanting discharge opening 30 extending from the front wall to the back wall in the longitudinal direction of the conveyor. The opening 30 is continuous in the direction of travel of the conveyor. Thus, in the form shown, material picked up by one of the paddles as it passes around and under the inner drive sprocket 19 begins almost immediately to spill over the edge of the plate 29 into the opening 30. As the paddle moves outwardly, the continuous discharge opening is progressively presented to each portion of the paddle in turn and the material falls to the ground in an even stream. It will be apparent, however, that the tapered opening or plate edge is suitable only for broadcast fertilizers, seeds and the like. If it is desired to deposit material in rows, the edge of the discharge opening is given a step-like form, as shown in Fig. 10. In this form, small discrete increments of material are deposited successively, as each of the step-like edges are progressively or successively presented to a paddle in its travel from end to end of the channel 26.

If the discharge opening 30 in bottom plate 29 is formed by tapering a longitudinal edge of the orifice plate, it will be apparent that at about half the distance to the outer end of the conveyor, the paddles would become unbalanced since one end would be unsupported. In the preferred form this condition is remedied by extending a flange 32 inwardly from the front wall of the conveyor housing to receive the weight of the paddles and drive chain, as shown in Fig. 5. At its outer end, the conveyor chain passes over the outer sprocket 22 journalled in adjustable bearing blocks 34 in the front and rear walls of the conveyor housing.

In the return path of the conveyor as it moves inwardly to pick up a new charge of material from the hopper 16, the weight of the chain and paddles is supported by an upwardly extending member 36. Member 36 preferably has a flat top portion on which the chain 20 can run and which is carried by depending legs 38 fixed to the front and rear walls of the conveyor housing, as by bolts 40. The member thus forms also a substantially continuous cover for the active part of the conveyor and allows operation in rainy weather without danger of the conveyed material becoming too wet to be satisfactorily distributed. Further the cover prevents the escape of dust from the conveyor and it has been found in use that very finely ground fertilizers may be distributed without the usually attendant cloud of dust behind the truck. Further the conveyor has been found capable of distributing materials of widely varying moisture content since there is no tendency for the parts to become clogged in use.

While the conveyors extend outwardly beyond the sides of the truck during field operation, provision is made for folding the laterally extending units out of the way for road travel. As shown in Fig. 7, the front and rear walls of the conveyor housing are interrupted and provided with heavy hinge plates 50, 52 extending upwardly adjacent each other and held together by front and rear pintles 54 about which the hinge plates are rotatable. At this point in the conveyor the upstanding cover and support member 36 is interrupted and the upper surface brought down at a slant, as at 56, to assure freedom of movement of the chain 20 into its folded position and to provide a surface which will be certainly engaged by the conveyor chain even though it may sag somewhat into the space between the inner and outer section of the support member during operation. Brackets 58 and 59 are provided to receive the folded outer conveyor section during road travel, as indicated in dotted lines in Fig. 1.

The drive for the conveyors may take any suitable form, but must be variable as to speed. This drive may be accomplished either by the use of geared transmissions or by changing sprockets to provide different drive ratios. The distributing conveyors are capable of satisfactory operation over a very wide range of speed since material does not jam or pack in the conveyor, nor is there any tendency to discharge all material in a narrow area as in the case of certain known units. Thus at the selection of the operator the quantity of fertilizer or other material delivered per unit area may vary widely.

Power for the conveyor drive is taken from the conventional truck power take-off into a shaft 60 and thence into a variable speed transmission 61 having a speed change lever 62. Power out of the transmission passes through a shaft 63 journalled at 64 and 66 and having universal joints 68 and 70 at each end so that its alignment is not critical. The shaft 63 may be continued, or a smaller drive shaft section 72 may be used to carry a driving sprocket 74 and to drive a reduction gear 76, shaft section 72 being journalled at 78 and 80 on each side of the sprocket. The reduction gear 76 is a conventional right angle drive unit and its output shaft 82 is connected to sprockets 84 which drive the truck bottom conveyor chains 14.

Sprocket 74 drives a chain 90 which is trained over a driven sprocket 92 beneath the truck body. The shaft on which sprocket 92 is mounted also carries one of a mating set of spur gears 94, 96, as shown in Fig. 8, the gears being journalled in a housing 98 fixed to the truck chassis in any suitable manner. The shafts driven by the mating gears 94 and 96 extend out of the housing and are provided with universal drive connections by which they are connected with the respective shafts 18 on which are carried distributing conveyor sprockets 19. It will thus be apparent that the speed of movement of the distributing conveyors and of the supply conveyor bars 15 are related and vary with each other. Since the transmission 61 is capable of providing several input to output speed ratios, the operator can select that speed which will afford the desired density of material distribution per unit area, and can still operate his truck engine at its most efficient speed. Thus the engine speed and the rate of distribution are both flexible and may be chosen by the operator.

Various refinements may be added to the drive unit such as overload release connections and change speed gearing in the gear reduction unit 76. The present disclosure is sufficient to enable those skilled in the art to understand the scope of the invention as defined in the appended claims.

What we claim is:

1. An apparatus of the class described including a trough for attachment to a vehicle body transversely thereof and in communication at its inner end with a discharge outlet therefrom, said trough comprising parallel side walls and a flat horizontal bottom, said bottom being provided with an elongated longitudinally extending discharge opening with the side edges thereof diverging to outwardly increase its width and correspondingly decrease the material supporting surface of the bottom lengthwise thereof, and an endless conveyor having a plurality of spaced cross-pieces for progressively pushing the material outwardly along the bottom of the trough to cause it to discharge through said opening.

2. A material spreading apparatus comprising a trough-like member for attaching to a vehicle body transversely thereof and in communication at its inner end with a discharge outlet therefrom, said member having opposing side walls and a substantially flat horizontal bottom therebetween with the effective or material supporting portion of the bottom progressively narrowed toward the outer end thereof to provide at least one bottom discharge opening for the material lengthwise of the member with outwardly increasing width and correspondingly decreasing material supporting surface, and an endless conveyor having successive lengthwise spaced scraper blades that move longitudinally over the member bottom to force the material outwardly along the member bottom to cause it to progressively discharge over at least one edge of the bottom opening.

3. A material spreading apparatus comprising a trough for attachment to a vehicle body transversely thereof and in communication at its inner end with a discharge outlet therefrom, said trough having opposing side walls and a substantially flat horizontal bottom plate, and being of substantially uniform width between its sides, the aggregate effective or material supporting portion of the bottom plate gradually decreasing in width lengthwise thereof for a predetermined portion of its length with the broadest area at the inlet end of the trough whereby to provide a bottom discharge opening for the material as it is forced lengthwise over the bottom plate, which opening gradually increases in width lengthwise of the trough and outwardly from its inner end and a conveyor operating over the bottom plate of the trough to force the material lengthwise thereover parallel to the trough sides.

4. An arrangement as called for in claim 2 wherein the bottom discharge opening has a substantially straight material discharge edge that is diagonal to the trough sides.

5. An arrangement as called for in claim 2 wherein the bottom discharge opening has a stepped material discharge edge that is generally diagonal to the trough sides.

FRED BISZANTZ.
PHILIP S. HARTMAN.

REFERENCES CITED

The following references are of record in the file of this patent:

UNITED STATES PATENTS

| Number | Name | Date |
|---|---|---|
| 896,178 | Tuttle | Aug. 18, 1908 |
| 1,668,516 | Litchfield et al. | May 1, 1928 |
| 2,221,266 | Roach | Nov. 12, 1940 |
| 2,280,234 | Harvey | Apr. 21, 1942 |
| 2,350,476 | Richey | June 6, 1944 |
| 2,369,755 | Rosselot | Feb. 20, 1945 |
| 2,416,898 | Breeze | Mar. 4, 1947 |